United States Patent
Baz

(10) Patent No.: US 6,846,415 B2
(45) Date of Patent: Jan. 25, 2005

(54) FUEL SUPPLY DEVICE FOR A MOTOR VEHICLE

(75) Inventor: Alfonso Baz, Madrid (ES)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/381,491

(22) PCT Filed: May 7, 2002

(86) PCT No.: PCT/DE02/01638
§ 371 (c)(1),
(2), (4) Date: Sep. 17, 2003

(87) PCT Pub. No.: WO03/011626
PCT Pub. Date: Feb. 13, 2003

(65) Prior Publication Data
US 2004/0050371 A1 Mar. 18, 2004

(30) Foreign Application Priority Data
Jul. 26, 2001 (DE) .......................... 101 36 437

(51) Int. Cl.[7] .......................... B01D 35/02; F02M 37/10
(52) U.S. Cl. ..................................... 210/416.4; 210/232
(58) Field of Search ................................ 210/136, 232, 210/416.1, 416.4

(56) References Cited

U.S. PATENT DOCUMENTS 5,094,747 A  *  3/1992  Johnson ...................... 210/266
5,699,773 A     12/1997 Kleppner et al.
5,989,413 A  * 11/1999  Jauss et al. .................. 210/109

FOREIGN PATENT DOCUMENTS

| DE | 197 09 780 A1 | 3/1997 |
|---|---|---|
| DE | 199 12 642 A1 | 3/1999 |
| EP | 0 754 483 A1 | 11/1995 |
| EP | 0 959 242 A1 | 5/1999 |
| FR | 2 663 991 A1 | 6/1990 |
| WO | WO 99/52732 | 10/1999 |

* cited by examiner

*Primary Examiner*—Fred G. Prince
(74) *Attorney, Agent, or Firm*—Ronald E. Greigg

(57) ABSTRACT

The fuel supply system has a fuel tank, a cup-shaped storage container in the fuel tank with a feed unit disposed in the storage container operable to pump fuel out of the storage container to an internal combustion engine (10) of the motor vehicle. A filter surrounds the feed unit over at least part of its circumference is disposed in the storage container, through which filter the fuel pumped by the feed unit to the engine flows. The filter is disposed in the storage container next to the feed unit, is embodied with a crescent-shaped curved cross section, and surrounds the feed unit over part of its circumference. The filter has a filter insert folded in star-shaped fashion.

17 Claims, 2 Drawing Sheets

FUEL SUPPLY DEVICE FOR A MOTOR VEHICLE

CROSS-REFERENCE TO RELATED APPLICATIONS

This application is a 35 USC 371 application of PCT/DE 02/01638 filed on May 7, 2002.

BACKGROUND OF THE INVENTION

1. Field of the Invention

The invention is directed to an improved fuel supply system for supplying fuel to the engine of a motor vehicle.

2. Description of the Prior Art

One fuel supply system of the type with which this invention is concerned, known from German Patent Disclosure DE 197 09 780 A1, has a fuel tank in which a cup-shaped storage container is disposed. A feed unit disposed in the storage container aspirates fuel from the storage container and pumps it to an internal combustion engine of the motor vehicle. Also disposed in the storage container is a filter, through which the fuel pumped by the feed unit to the engine flows. The filter is disposed coaxially with the feed unit and surrounds it over its entire circumference. The filter should have the largest possible filter surface area, for the sake of attaining a long service life with adequate filtering action. Especially if the storage container is embodied with a small cross section, it is difficult to accommodate a filter with a large enough filter surface area in it.

SUMMARY OF THE INVENTION

The fuel supply system of the invention has the advantage over the prior art that even with a storage container of relatively small cross section, a filter with a large enough filter surface area can be disposed in the storage container.

BRIEF DESCRIPTION OF THE DRAWINGS

Other features and advantages of the invention will become apparent from the detailed description contained herein below, taken in conjunction with the drawings, in which.

DESCRIPTION OF THE PREFERRED EMBODIMENT

Figure 1:
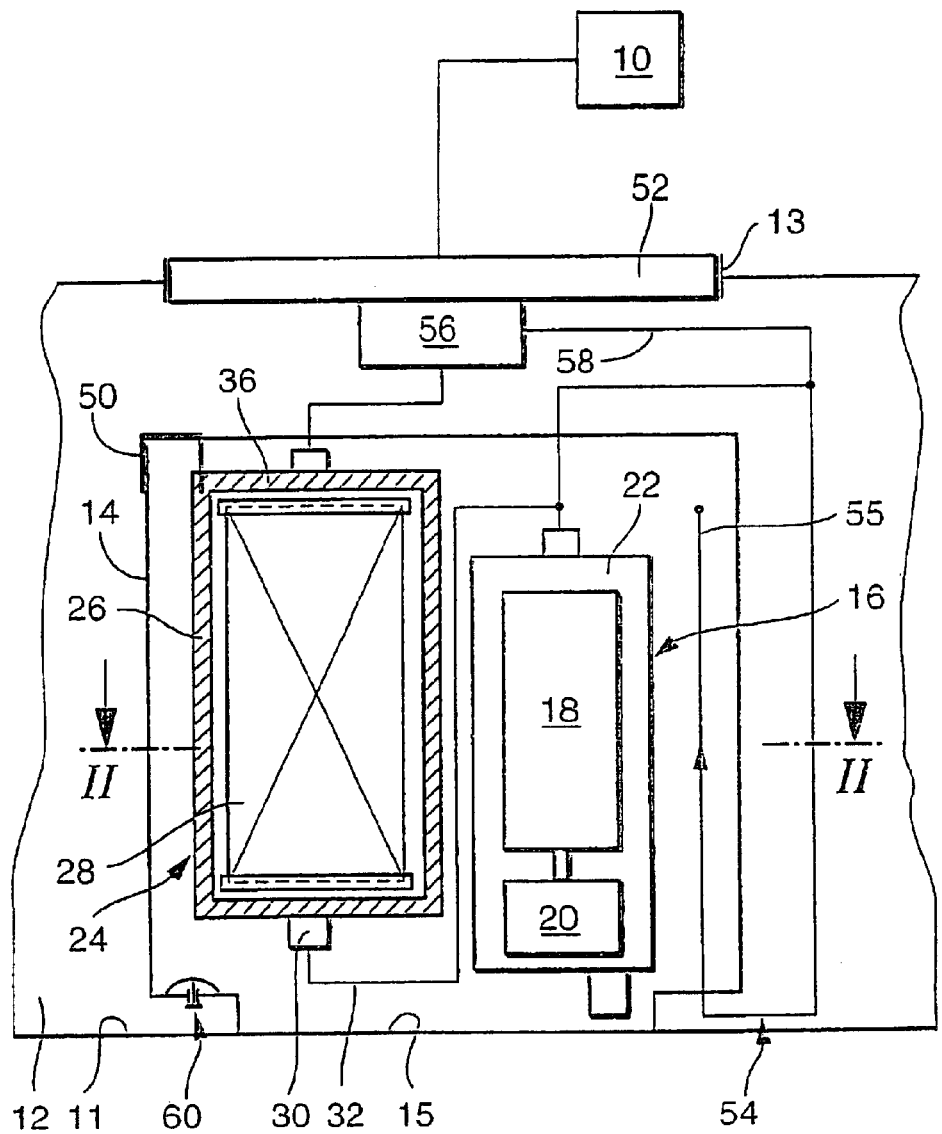
FIG. 1 shows a fuel supply system for a motor vehicle in a longitudinal section.
Figure 2:
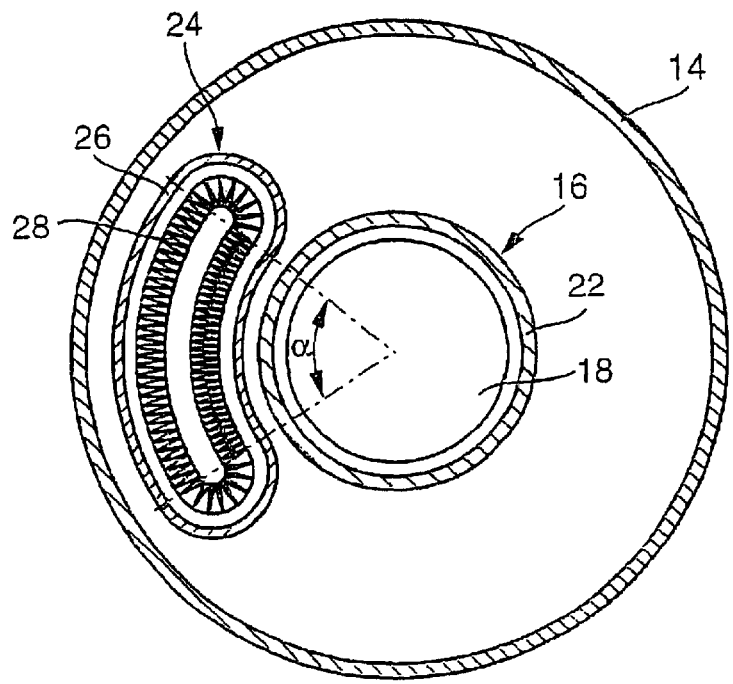
FIG. 2 shows a storage container of the fuel supply system in a cross section.
Figure 3:
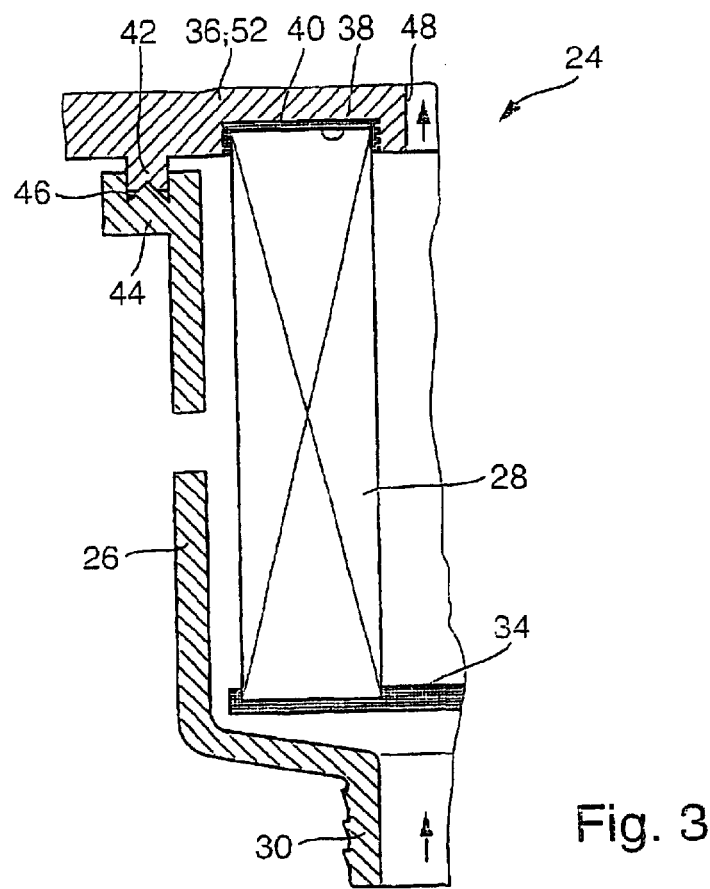
FIG. 3 is an enlarged detail of a filter of the fuel supply system in longitudinal section.

FIGS. 1–3 illustrate a fuel supply system having an internal combustion engine 10 with an injection system, by which fuel is injected into the cylinders of the engine. The fuel supply system has a fuel tank 12, in which a cup-shaped storage container 14 is disposed that is seated on the bottom 11 of the fuel tank 12. The storage container 14 has a substantially smaller volume than the fuel tank 12. The fuel tank 12 has an opening 13 in its upper wall, through which the storage container 14 can be inserted into the fuel tank 12. The fuel supply system also has a feed unit 16, with an electric motor 18 as its drive mechanism and with a pumping part 20 driven thereby. The electric motor 18 and the pumping part 20 are disposed in a common cylindrical housing 22. The feed unit 16 is disposed upright in the storage container 14; the pumping part 20 is disposed at the bottom and the electric motor 18 is disposed at the top. The feed unit 16 is secured in the storage container 14 for instance in the usual way, which is therefore not shown in further detail. By means of the feed unit 16, fuel from the storage container 14 is pumped to the injection system of the engine 10.

A filter 24 is also disposed in the storage container 14, next to the feed unit 16; in cross section, it is embodied as curved in crescent form, as shown in FIG. 2, and it surrounds the feed unit 16, which is cylindrical in its outer contour, over a portion of the circumference thereof. The fuel pumped by the feed unit 16 to the injection system of the engine 10 flows through the filter 24. The filter 24 extends around the feed unit 16, relative to the longitudinal axis thereof, over an angle alpha of approximately 50° to 90°, preferably approximately 70°.

The filter 24, as shown in FIGS. 2 and 3, has a cup-shaped housing 26, in which a filter insert 28 that is folded in accordian or star-shaped fashion is disposed. The angle alpha refers to the center point of each of the curved edges of the filter 24, which point in the circumferential direction. The housing 26 of the filter 24 preferably comprises plastic and is made by injection molding. A connection stub 30 is formed onto the bottom of the housing 26, and a line 32, for instance in the form of a hose, is connected to it and is connected on its other end to the outlet of the feed unit 16. The filter insert 28, on its lower end, has a cap 34 tightly joined to it, which comprises plastic and in particular polyamide. The cap 34 can be formed onto the filter insert 28 by injection molding. The housing 26 of the filter 24 is tightly closed on its top side with a cap 36. Preferably, like the housing 26, the cap 36 comprises plastic. On its underside, pointing into the interior of the housing 26, the cap 36 has an annular indentation 38, into which the filter insert 28 dips with its upper edge. The filter insert 28 is secured at its at upper edge in the indentation 38, for instance by means of a press-fit or shrink-fit connection and/or by means of adhesive 40. A downward-protruding rib 42 that approximately coaxially surrounds the indentation 38 is disposed on the underside of the cap 36. The housing 26, on its upper end, has an encompassing flange 44 with an annular groove 46 that is open at the top. The rib 42 of the cap 36 dips into the annular groove 46 and is secured in it by means of adhesive or by means of a welded connection, in particular an ultrasonic welded connection, as a result of which the housing 26 and cap 36 are tightly joined together. Within the contour of the indentation 38, an outlet opening 48 is provided in the cap 36; it can be curved in crescent form in a manner corresponding to the cross-sectional shape of the filter 24.

The housing 26 of the filter 24 is secured to the storage container 14 as shown in FIG. 1, for instance by means of one or more retaining clamps 50. The retaining clamps 50 are disposed for instance on the upper edge of the housing 26 and fit over the upper edge of the storage container 14. The filter 24 is inserted from the top into the storage container 14, and its retaining clamps 50 then positioned over the edge of the storage container 14. The retaining clamps 50 can be secured to the storage container 14 by means of a detent connection.

Fuel pumped by the feed unit 16 reaches the filter 24 through the line 32 and the stub 30, then flows radially inward through the filter insert 28 and emerges, cleaned, through the outlet opening 48 and continues on until it reaches the injection system of the engine 10. As an alternative to the embodiment described above, it can also be provided that the filter housing 26 of the filter 24 is secured to a closure element 52 that closes the opening 13 of the fuel tank 12. The closure element 52 may, like the cap 36 described above, have an annular indentation on its inside pointing into the interior of the fuel tank 12, into which indentation the filter insert 28 dips with its upper edge and to which the filter insert is secured. The housing 26 of the filter 24 is connected by its flange 44 to the closure element 52. Additional fastening of the housing 26 of the filter 24 to the storage container 14 can then be omitted. The closure element 52 can furthermore serve to fix the storage container 14 in the fuel tank 12 whereby the retaining clamps 50 are likewise not necessary.

On the bottom 15 of the storage container 14, as shown in FIG. 1, a jet pump 54 is disposed, through which fuel from the fuel tank 12 is pumped into the storage container 14. The jet pump 54 pumps fuel into the storage container 14 via a riser line 55 that discharges near the upper edge of the storage container 14. The propellant quantity required for the operation of the jet pump 54 can be diverted for instance from the outlet of the feed unit 16. Alternatively, a return from the injection system into the fuel tank 12, by which fuel pumped by the feed unit 16 but not consumed by the engine 10 is returned, can be delivered to the jet pump 54 as a propellant quantity. Alternatively, it can also be provided that a pressure regulator 56 is disposed in the region of the fuel tank 12, for instance inside the fuel tank 12 or on the closure element 52, by which reaulator the pressure of the fuel supplied to the injection system of the engine 10 is regulated. The pressure regulator 56 has a return 58, through which fuel diverted by the pressure regulator 56 returns to the fuel tank 12 and can be supplied to the jet pump 54 as a propellant quantity.

A check valve 60 can be disposed on the bottom 15 of the storage container 14; it allows fuel to flow into the storage container 14 from the fuel tank 12 but prevents an outflow of fuel from the storage container 14 into the fuel tank 12, if the level of fuel in the fuel tank 12 is lower tank in the storage container 14. The check valve 60 makes filling of the storage container 14 possible when the fuel tank 12 is filled at the service station. The filter 24 can for instance be disposed above the check valve 60 in the storage container 14.

The foregoing relates to preferred exemplary embodiments of the invention, it being understood that other variants and embodiments thereof are possible within the spirit and scope of the invention, the latter being defined by the appended claims.

I claim:

1. A fuel supply system for a motor vehicle, the system comprising
    a fuel tank (12),
    a cup-shaped storage container (14) disposed in the fuel tank (12)
    a feed unit (16) disposed in the storage container (14) and operable to pump fuel out of the storage container (14) to an internal combustion engine (10) of the motor vehicle,
    a filter (24) disposed in the storage container (14) and surrounding the feed unit (16) over at least part of its circumference, the fuel pumped by the feed unit (16) to the engine (10) flowing through the filter (24)
    the filter (24) being disposed in the storage container (14) adjacent to the feed unit (16) and being embodied with a crescent-shape curved cross section surrounding the feed unit (16) over part of its circumference.

2. The fuel supply system of claim 1, wherein the filter (24) comprises a filter insert (28) folded in star-shaped fashion.

3. The fuel supply system of claim 2, wherein the fuel tank (12) has an opening (13), through which the storage container (14) can be inserted into it; wherein the opening (13) is closed with a closure element (52); and wherein the filter (24) has a housing (26) that is secured to the closure element (52).

4. The fuel supply system of claim 2, wherein the filter (24) comprises a housing (26) secured to the storage container (14).

5. The fuel supply system of claim 2, wherein the filter (24) surrounds the feed unit (16) over an angle between approximately 50° and 90°.

6. The fuel supply system of claim 5, wherein the filter (24) comprises a housing (26) secured to the storage container (14).

7. The fuel supply system of claim 5, wherein the fuel tank (12) has an opening (13), through which the storage container (14) can be inserted into it; wherein the opening (13) is closed with a closure element (52); and wherein the filter (24) has a housing (26) that is secured to the closure element (52).

8. The fuel supply system of claim 1, wherein the filter (24) surrounds the feed unit (16) over an angle between approximately 50° and 90°.

9. The fuel supply system of claim 8, wherein the filter (24) comprises a housing (26) secured to the storage container (14).

10. The fuel supply system of claim 8, wherein the fuel tank (12) has an opening (13), through which the storage container (14) can be inserted into it; wherein the opening (13) is closed with a closure element (52); and wherein the filter (24) has a housing (26) that is secured to the closure element (52).

11. The fuel supply system of claim 1, wherein the fuel tank (12) has an opening (13), through which the storage container (14) can be inserted into it; wherein the opening (13) is closed with a closure element (52); and wherein the filter (24) has a housing (26) that is secured to the closure element (52).

12. The fuel supply system of claim 11, wherein the housing (26) of the filter (24) is secured to the closure element (52) by means of an adhesive connection or welded connection.

13. The fuel supply system of claim 11, wherein the closure element (52), on its inside pointing into the interior of the fuel tank (12), has an annular indentation (38), into which a filter insert (28) of the filter (24) is tightly inserted.

14. The fuel supply system of claim 13, wherein the housing (26) of the filter (24) is secured to the closure element (52) by means of an adhesive connection or welded connection.

15. The fuel supply system of claim 13, wherein the filter insert (28) is secured in the indentation (38) by means of adhesive (40).

16. The fuel supply system of claim 15, wherein the housing (26) of the filter (24) is secured to the closure element (52) by means of an adhesive connection or welded connection.

17. The fuel supply system of claim 1, wherein the filter (24) comprises a housing (26) secured to the storage container (14).

* * * * *